United States Patent [19]

Sullivan

[11] Patent Number: 5,514,855
[45] Date of Patent: May 7, 1996

[54] COMPUTER KEYBOARD ADAPTER PROVIDING LARGE SIZE KEY SURFACES

[75] Inventor: Daniel O. Sullivan, Setauket, N.Y.

[73] Assignee: Alpha Logic, Incorporated, Port Jefferson, N.Y.

[21] Appl. No.: 419,062

[22] Filed: Apr. 10, 1995

Related U.S. Application Data

[63] Continuation of Ser. No. 210,231, Mar. 17, 1994, abandoned.

[51] Int. Cl.⁶ .............................. G06C 7/00; G06C 7/02; B41J 5/00
[52] U.S. Cl. .................. 235/145 R; 235/145 A; 235/146; 400/496
[58] Field of Search .................. 235/145 R, 146, 235/145 A; 400/98, 99, 472, 473, 476, 489, 490, 496; 273/148 B, 438

[56] References Cited

U.S. PATENT DOCUMENTS

| | | | |
|---|---|---|---|
| 3,317,019 | 5/1967 | Braune | 235/146 |
| 3,964,594 | 6/1976 | Gabbrielli et al. | 235/145 A |
| 4,012,127 | 3/1977 | Bolander | 359/809 |
| 4,020,328 | 4/1977 | Brandam | 235/146 |
| 4,030,094 | 6/1977 | Anderson | 235/145 R |
| 4,100,402 | 7/1978 | Lundström et al. | 235/145 R |
| 4,158,130 | 6/1979 | Speraw et al. | 235/146 |
| 4,199,839 | 10/1978 | Beckmann et al. | 235/145 R |
| 4,595,804 | 6/1986 | MacConnell | 200/5 A |
| 5,089,690 | 2/1992 | Okamura | 235/145 R |
| 5,092,459 | 3/1992 | Uljanic et al. | 235/145 R |
| 5,096,317 | 3/1992 | Phillippe | 235/145 R |
| 5,214,429 | 5/1993 | Greenberger | 341/22 |

OTHER PUBLICATIONS

Cover letter and NTN Entertainment Network input device with a keyboard overlay. (no date).

*Primary Examiner*—Michael L. Gellner
*Assistant Examiner*—Eddie C. Lee
*Attorney, Agent, or Firm*—Cohen, Pontani, Lieberman, Pavane

[57] ABSTRACT

An adapter device, for use with a standard personal computer having affixed thereto a keyboard, is comprised of a molded rigid panel which is provided with a plurality of over-sized keys. The adapter is intended to simplify standard personal computer input methods by providing an input devise with a fewer number of Adapter keys than a standard keyboard. The adapter keys are also larger than standard keys. Raised spines on the under side of the adapter secure the adapter to a standard computer keyboard. Each of the keys on the adapter are attached via hinge along one side of the key. Depressing any of the adapter keys will cause that adapter key to contact the keys of host keyboard in a prescribed manner. An accompanying simplified software program is installed on the personal computer to work in conjunction with the adapter.

11 Claims, 3 Drawing Sheets

COMPUTER KEYBOARD ADAPTER PROVIDING LARGE SIZE KEY SURFACES

This is a continuation of application Ser. No. 08/210,231, filed Mar. 17, 1994, now abandoned.

BACKGROUND OF THE INVENTION

1. Field of the Invention

The field of the invention is personal computers and in particular those personal computers which are designed for users who require simplified input output methods.

2. Prior Art

The personal computer first became available to the consumer in the late nineteen seventies and was used primarily for business applications such as word processing, accounting, and various numerical analysis tasks. The personal computers provided an alternative to larger systems which were more costly in terms of purchase price, space, environmental requirements, and general system maintenance. In addition to the scaled down hardware of the personal computer, the software, particularly in the area of the user interface, was simplified enabling more people to benefit from the computer's capabilities with less training than was required with older main frame type systems. Over the past decade, the development of personal computer hardware and software has become a major industry with a vast array of companies adding products to the personal computer market with the continued development of higher performing processors, hardware peripherals such as modems and fax cards, and specialized software with graphical user interfaces such as Microsoft Windows™.

A particular field of development has arisen in the area of educational software. Many software programs are commercially available which aid in the education of subjects such as reading fundamentals, mathematics, and geography. Specialized software programs exist which are designed to be used for particular age groups ranging from young children to adult. There is a limit, however, to the effectiveness of software programs for young children. This limitation is due, in large part, to the current methods of system input which require substantial eye to hand motor coordination. These input devices, namely the conventional or standard 101 key alpha numeric keyboard, and the point and click mouse can each be intimidating to the young user. The keyboard has a large number of small keys which are difficult to identify and select thus potentially causing an incorrect response to a software prompt even though the user is mentally capable of producing a correct response. Incidents such as this will often lead to frustration and reduction in the effectiveness of the software program. Similarly, the mouse interface requires significant coordination and is not easily mastered by the young PC user.

Other input devices have been developed such as the touch screen interface. This interface has not proliferated into the educational software field perhaps due to its significant cost. Although the educational software market is large, there is not an input device product which is designed exclusively for young children. Therefore it is a goal of the present invention to provide a low cost unit which will make use of existing equipment which is designed for general purpose use, and modify it in an easily reversible manner, for the specialized application of educational software for young children.

It has been known to provide a device which fits over or houses a standard keyboard allowing the existing keys of a keyboard to be renamed or allowing limited access to the full range of keys provided on the keyboard. These previous inventions, while restricting the number of keys to be accessed or relabeling existing keys, still require the user to locate and access a standard keyboard key which is a restrictive task for those with limited or under developed motor skills, particularly young children. The prior art in this field has not produced a design which facilitates the data input process through the use of an adapter device with enlarged keys, depressing of which will have the effect of depressing one or more of the keys on the standard keyboard. The invention, while limiting the number of accessible keys, is intended to be used with specialized software.

SUMMARY OF THE INVENTION

It is an object of the invention to simplify the use of existing personal computer input/output methods in order to facilitate use by young children. The input procedures associated with the personal computer are simplified by providing an invention, a Keyboard Adapter, which will serve as an input device with fewer keys than an industry standard keyboard. The Keyboard Adapter keys provided are of a larger size than the keys found on an industry standard Keyboard. The invention is intended to allow use of the personal computer in two modes, namely standard mode and simplified mode. As the computer is generally used for many different tasks both at home or in an educational institution, the invention will allow use of the computer in standard mode and will not interfere with the standard keyboard keys and input methods employed by any software programs which may be used on the computer.

In order to employ the invention in simplified mode, a specialized children's software application is invoked while the invention is in standard mode. While the children's software application is being loaded or is ready for use, the invention is placed into simplified mode by removing the invention from a storage location and placing the invention on top of the existing computer keyboard.

As the invention is lowered onto the existing keyboard using one hand on each of its sides, ribs or spines located on the underside of the invention will mate with the spaces between the existing keyboard keys and provide a means for securing the invention to the existing keyboard. This means for securing will prevent side to side movement of the invention but will not prevent the invention from being lifted directly up in a direction perpendicular to the plane area of the keyboard surface. This means for securing will also not interfere with the motion of any of the keys on the existing keyboard. Once the adapter is in place on the existing keyboard, the user is prompted by the specialized children's application software program to provide an input by pressing one or more of a plurality of large sized keys which are incorporated into the invention.

Preferably, each key of the adapter is hingedly attached to the body of the adapter in such a way as to allow the key to pivot when depressed by the user. When depressed, an adapter key will encounter and cause to be depressed one or more of a select group of keys on the existing keyboard. The software application program will determine which key or keys on the existing key board have been depressed and associate that input with a predetermined group defined by the software. In order to return to an undepressed state, the exiting spring mechanism incorporated into the standard keyboard key is utilized. The spring mechanism produces an upward force on the Adapter key thus returning it to an undepressed state.

Each of keys of the Adapter is provided with removable alpha/numeric labels which correspond to directions given by the specialized software program. The user may opt to make use of varied functionality of the software program and make suitable changes to these labels. In order to exit the simplified mode, a particular key input is executed using the Adapter and the specialized use software program will be terminated. The Adapter may then be removed by lifting it from the surface of the standard keyboard. The procedures for entering and exiting the simplified mode are simple enough to be executed several times in a daily period without inconvenience.

The various features of novelty which characterize the invention are pointed out with particularity in the claims annexed to and forming a part of the disclosure. For a better understanding of the invention, its operating advantages, and specific object attained by its use, reference should be had to the drawing and descriptive matter in which there are illustrated and described preferred embodiments of the invention.

DETAILED DESCRIPTION OF THE INVENTION

Figure 1:
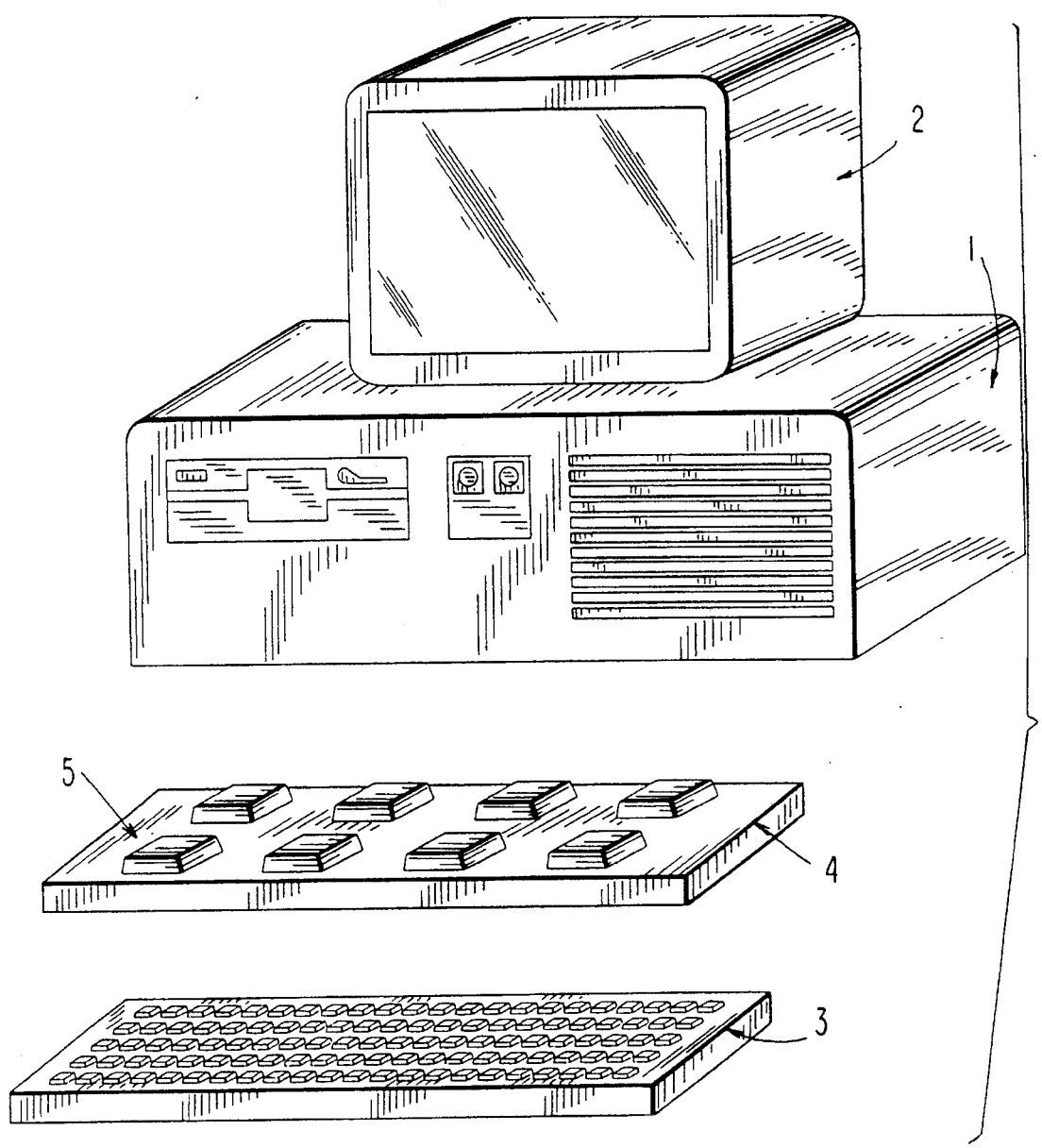
FIG. 1 shows a personal computer system utilizing an adapter constructed in accordance with an illustrative embodiment of the present invention.

FIG. 1 depicts the components 1, 2 and 3 which comprise a general purpose personal computer. The personal computer components are identified as processor unit 1, which unit may be a standard AT type machine as popularized by IBM, monitor 2, and conventional, or standard keyboard 3. Keyboard 3 may be, for example, an industry standard 101 key keyboard. Also shown in FIG. 1 is the keyboard adapter 4 of the present invention. The personal computer rests on a table top or console (not shown) which may be located in a private home, office, or educational institution. With the introduction of the keyboard adapter 4 of the present invention, the personal computer is deemed to operate in two modes, namely standard mode and simplified mode. Switching between these two modes requires little effort and could be accomplished several times in a daily period with no inconvenience to the user.

In the standard mode, the personal computer is designed to perform many different functions simply by activating a particular software program which is resident within the processor 1. The method of input in general use mode is by the use of the standard keyboard 3. In a simplified mode of operation, the personal computer employs the use of a particular software program which is also resident in said processor 1. We will refer to the particular program which is used in said simplified mode as the simplified program. The method of input in the simplified mode is by the use of keyboard adapter 4. Simplified mode is activated by inputting a simplified mode activation command using the standard keyboard 3 while the computer is in general use mode. The activation command invokes the simplified program, which in turn causes instructions to be displayed on monitor 2, thereby indicating that the program is ready to accept input from keyboard adapter 4. The user then places the keyboard adapter 4 on top of standard keyboard 3 and responds to the directions displayed on the monitor 4 by depressing one or more adapter keys 5.

As indicated above, simplified mode keyboard adapter 4 is employed with a simplified program designed to receive input exclusively from the keyboard adapter. A plurality of large size keys 5 are incorporated into the keyboard adapter 4. Each of the adapter keys 5 is assigned a correspondence to a group of keys on the standard keyboard 3. Correspondingly, the simplified program identifies each of the standard keyboard keys and divides them into distinct groups. The relationship between the adapter keys and the standard keyboard keys is such that the act of depressing a particular adapter key will have the effect of depressing at least one key of a particular group of keys on the standard keyboard. The number of defined groups is less than the number of distinct standard keyboard keys and a particular standard keyboard key is a member of exactly one group.

A response is received and interpreted by the simplified program by first determining which of the keyboard keys of the standard keyboard is depressed. The simplified program then determines to which group the particular key is a member and in turn determines which key was depressed on keyboard adapter 4. The user need only be familiar with the meaning of the adapter keys only. That is, no knowledge of the underlying relationship between the standard keyboard and the keyboard adapter is required on the part of the user.

Figure 2:
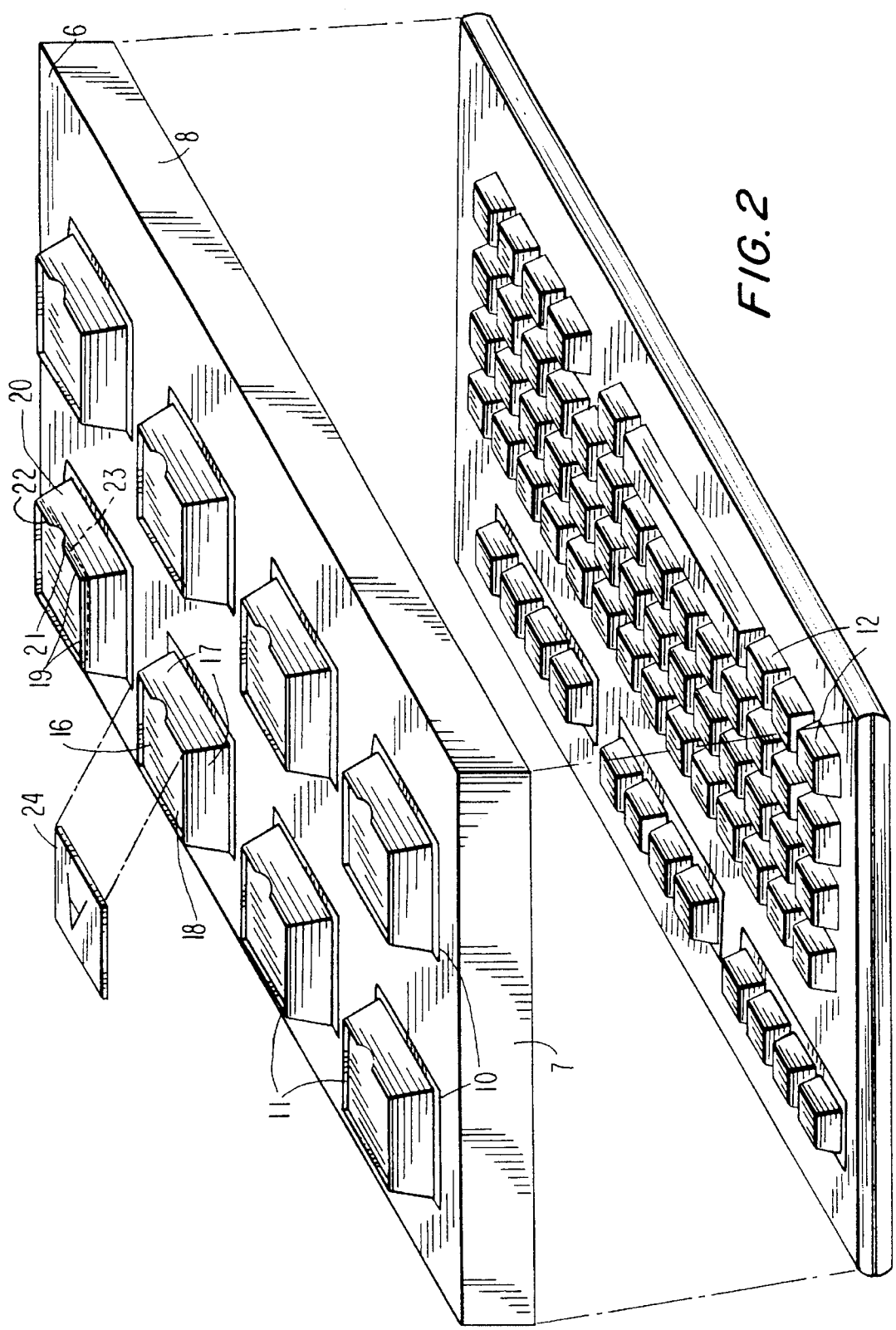
FIG. 2 is an enlarged perspective view depicting the placement of the keyboard adapter having a plurality of large sized keys over a conventional keyboard.
Figure 3:
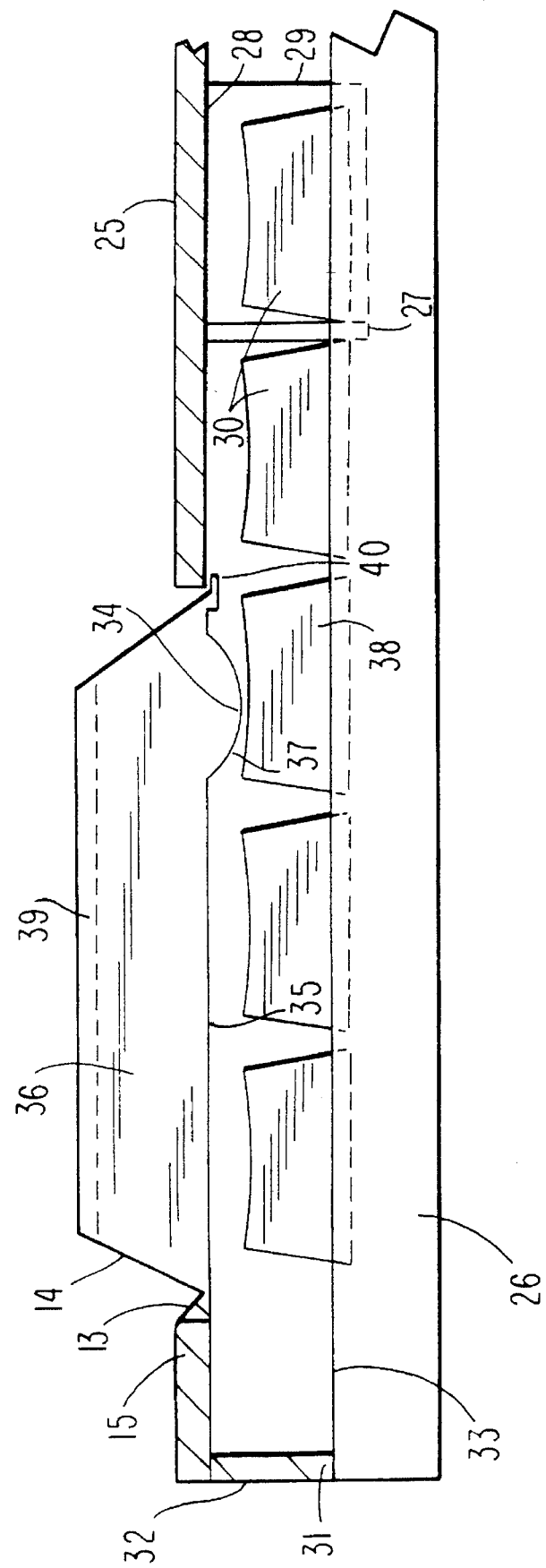
FIG. 3 is an enlarged, partial cross-sectional view along lines 3—3 of FIG. 1 depicting the manner in which one of the large sized adapter keys is disposed relative to a group of keyboard keys.

As seen in FIG. 2, the keyboard adapter of the present invention comprises a planar top panel 6, two side panels 7 (only one of which is shown for clarity), a front edge panel 8 and a rear edge panel 32 (FIG. 3). Each of the panels identified is fabricated of a rigid material and are joined to form a rigid assembly. A plurality of rectangular holes 10 are incorporated into top panel 6. Into each of these rectangular holes 10 is positioned a large sized adapter key 11. Each of the adapter keys 11 is demonstrably larger than the keys 12 of standard keyboard 3. A live hinge 13 (FIG.3) is located proximate the upper edge 14 of adapter key 36 and the inside upper edge 15 of each of the rectangular holes 10 in top panel 6. Hinge 13 is a live hinge that is created by making the hinge portion thinner than the surrounding portions so that any bending action is localized at the thinner portion, i.e., the living hinge as shown in FIG. 3. The construction of a live hinge is readily known by a person ordinarily skilled on the art.

Hinge 13 is of an elastic nature and will support the weight of the adapter key 10 but will not be so rigid as to prevent rotational movement from a light force imparted by the user directed on the upper surface 39 of the adapter key 36. The upper surface 16 (FIG. 2) and walls 17 (front and left side shown) of the adapter key together define a rectangular recess 18 which serves as a means for labeling the adapter key in the following manner: upper surface 16 is joined to walls 17 of adapter key 11 in a horizontal position just below the top edges 19 of walls 17. A from wall 20 of the adapter key contains a notched area 21 on its upper edge 22 in a manner such that in the notched area 21, the upper edge 22 of front wall 20 directly meets the front edge 23 (hidden) of upper surface 16. A label 24, which may be made from a thin rectangular rigid material, may be inserted within rectangular recessed area 18 and may be removed therefrom by a lifting motion from a user's finger placed in notch 21.

A plurality of labels (not shown) such as label 24 are provided, each uniquely defined by an alpha/numeric character. Each of the adapter keys 11 is thus provided with a unique label. The character which is assigned to any of the adapter keys 11 is determined by the simplified program. The simplified program will periodically request that the user replace one or more of the labels in order to execute alternative software functionality.

As best shown in FIG. 3, means for securing the adapter 25 to a standard keyboard 26 is achieved by the use of at least a first spine 27 rigidly mounted on the under side 28 of adapter 25. First spine 27 rests between standard keyboard keys 30, thus preventing any movement of the adapter in a direction perpendicular to the longitudinal surface of the first spine 27. A second spine 29 is mounted in a direction perpendicular to first spine 27 and also rests between standard keyboard keys (not shown). The second spine 29 prevents movement of the adapter in a direction perpendicular to the plane of the second spine. When installing the adapter 25, the user will ensure that each spine 27 is resting properly between predetermined keys as 30. When adapter 25 is properly installed, the bottom edge 31 of rear panel 32 will encounter the top planar surface 33 of standard keyboard 26. In a similar manner, the side panels and front panel also encounter (not shown) planar surface 33.

The adapter key 36 shares all properties with the plurality of adapter keys 11 (FIG. 2). The adapter key 36 is movable from an undepressed condition to a depressed condition by the application of a small amount of pressure exerted by the user on the upper surface 39 thereof. Adapter key 36 is movable from a depressed condition to an undepressed condition by the removal of pressure from the upper surface 39 of adapter key 36. In the undepressed condition, the bulbous surface 34, which is incorporated into the lower surface 35 of adapter key 36, rests just above the surface 37 of a particular standard keyboard key 38. In the depressed condition, a rotational motion of adapter key 36 is caused about the axis of hinge 13 thus causing bulbous surface 34 of adapter key 36 to make contact with and cause the depression of the particular standard keyboard key 38. In the depressed condition, the particular standard keyboard key 38 exerts an upward force on the adapter key 36 by means of an internally mounted spring. Moving to the undepressed condition is thus accomplished by the force exerted by the standard keyboard key 38, which force causes a counter rotation of the adapter key 36 about hinge 13. A lip 40 prevents adapter key 36 from rotating about hinge 13 to any position other than the undepressed condition.

Those skilled in the art will recognize that certain modifications to the present description could be incorporated without departing from the spirit of the claimed invention. For example in a modified embodiment of the adapter, 25 the means for securing may be configured as a fixed hinge, the elements of which are mounted to both the adapter keyboard 25 and the standard keyboard 3 to allow the adapter keyboard 25 to pivot along its top edge and thereby to be repositioned for access to the keys of the host keyboard without removing the adapter keyboard 25. In yet another possible embodiment, the adapter keyboard 25 may be configured as a housing with an upper surface identical to that of the first embodiment but with additional side and lower panels allowing a conventional keyboard 25 to be enclosed inside a sleeve-like adapter housing.

In another embodiment, the labels 24 of FIG. 2 could be modified such that each is provided with a unique figure or graphical depiction such as an animal or a geographic shape. The software program would be configured to recognize and employ such modifications. Alternatively, the means for labeling could be modified such that each label 24 is a sticker which may be affixed to an adapter key 5.

The invention is not limited by the embodiments described above which are presented as examples only but can be modified in various ways within the scope of protection defined by the appended patent claims.

What is claimed is:

1. A keyboard adapter of unitary construction for placement on a keyboard having a plurality of keys, comprising:

a frame including an upper wall defining a plurality of apertures, said upper wall defining an upper surface and a lower surface, said frame being dimensioned to envelop the plurality of keys on the keyboard;

a plurality of adapter keys, one located at each of said apertures, each said adapter key including an upper wall having an upper surface and a lower surface, each said upper wall of said adapter keys being sized to surround and extend over a plurality of preselected keys on the keyboard, and being hingedly connected to said frame for vertical movement relative to said frame, the lower surface of each of said adapter keys having a portion which engages one or more of said respective preselected keys of the keyboard when said upper wall of said adapter key is depressed for movement relative to said frame.

2. The keyboard adapter as described in claim 1, further including securing means for securing the adapter to the keyboard, said securing means comprising rigid spines depending from the lower surface of the said frame and being dimensioned and arranged to seat between the keys of the keyboard, thereby preventing the keyboard adapter from moving relative to the keyboard.

3. The keyboard adapter as described in claim 1, wherein each said adapter key includes means for retaining a label.

4. The keyboard adapter as described in claim 1, wherein said keyboard adapter defines an axial cavity dimensioned to receive at least a portion of said keyboard with said adapter keys being disposed above the keys thereof.

5. The keyboard adapter as described in claim 1, wherein the upper surface of each said adapter key is joined to a front panel, a left side panel, a right side panel and a rear panel.

6. The keyboard adapter as described in claim 1, wherein the portion of the lower surface defines a bulbous surface thereof, said bulbous surface being adapted to more precisely contact the keys.

7. The keyboard adapter as described in claim 1, wherein each said adapter key is responsive to movement of said keys, so that each said adapter key is moveable between a depressed condition and an undepressed condition.

8. The keyboard adapter as described in claim 1, wherein each said adapter key is provided with a lip on a front edge thereof, said lip being adapted to prevent a corresponding depressible surface from resting in any position other than said depressed or undepressed condition.

9. The keyboard adapter as described in claim 1, wherein each said adapter key is adapted to cause said keyboard to generate signals recognizable as input by a software program resident on a personal computer, said software program being adapted to prompt a user to depress at least one of said adapter keys.

10. The keyboard adapter as described in claim 9, where each said adapter key is operable to cause said software program to provide a display on a monitor coupled to said personal computer.

11. The keyboard adapter of claim 1, further comprising said keyboard.

* * * * *